(12) United States Patent
Kho et al.

(10) Patent No.: US 8,893,068 B1
(45) Date of Patent: Nov. 18, 2014

(54) TECHNIQUES TO GENERATE A MORE ACCURATE SIMULATION MODEL

(75) Inventors: Tong Choon Kho, Gelugor (MY); Joshua David Fender, East York (CA); Gurvinder Tiwana, Brampton (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/461,143

(22) Filed: May 1, 2012

(51) Int. Cl.
  *G06F 17/50* (2006.01)

(52) U.S. Cl.
  USPC ........... 716/114; 716/106; 716/110; 716/111; 716/115

(58) Field of Classification Search
  USPC .................................................. 716/106–115
  See application file for complete search history.

(56) References Cited

U.S. PATENT DOCUMENTS

| | | | |
|---|---|---|---|
| 7,418,679 B1 * | 8/2008 | Vashi et al. | 716/108 |
| 7,882,484 B1 * | 2/2011 | Baldwin et al. | 716/115 |
| 8,180,600 B2 * | 5/2012 | Chlipala et al. | 703/2 |
| 8,196,075 B1 * | 6/2012 | Garrault et al. | 716/104 |
| 8,324,930 B1 * | 12/2012 | Jenkins, IV | 326/38 |
| 2009/0146322 A1 * | 6/2009 | Weling et al. | 257/786 |
| 2010/0269079 A1 * | 10/2010 | Banerjee et al. | 716/5 |
| 2012/0191437 A1 * | 7/2012 | Yoshimura et al. | 703/14 |

OTHER PUBLICATIONS

"Improving Behavior IO Buffer Modeling Based on IBIS", by Ambrish K. Varma, Michael Stree, IEEE @2008.*
"Application of Surrogate Modeling to Generate Compact and PVT-sensitive IBIS Models", by Ting Zhu, and Paul D. Franzon, @2009 IEEE.*

* cited by examiner

*Primary Examiner* — Nha Nguyen
(74) *Attorney, Agent, or Firm* — Womble, Carlyle, Sandridge & Rice (57) ABSTRACT

Techniques generating a simulation model for a circuit design are disclosed. One of the techniques includes extracting a plurality design properties associated with the circuit design. The design properties are extracted from a netlist of the circuit design and may include an input/output (I/O) buffer setting extracted from a first netlist of the circuit design or an environmental condition associated with the circuit design. A second netlist for the circuit design is generated based on the design properties and is simulated based on the design properties. A simulation model for the circuit design is generated. In an exemplary embodiment, the simulation model reflects the I/O buffer setting or the environmental condition associated with the circuit design.

20 Claims, 7 Drawing Sheets

TECHNIQUES TO GENERATE A MORE ACCURATE SIMULATION MODEL

BACKGROUND

Electronic design automation (EDA) tools or applications are generally used by circuit developers to design integrated circuits (ICs). An IC may include many blocks of logic circuitry, registers, memory blocks, input/output (I/O) blocks, etc. These blocks may be configurable to perform different tasks. A generic routing or interconnection structure is typically used to connect the various blocks and circuitries within the IC in different ways. All these configurations are usually done using an EDA tool.

Designing an IC on an EDA tool generally includes, among others, synthesizing and translating the register transfer level (RTL) description of the circuit into a discrete netlist of logic-gate primitives, placing and routing the many components of the synthesized gate-level netlist, and analyzing and simulating the IC design. Various board level and signal integrity simulations are generally performed to model possible signal integrity issues such as ground bounce, cross talk, and simultaneously switching outputs (SSOs), etc. Different simulation models may be generated to allow the circuit designer to simulate the actual device with the EDA tool.

For example, Input/output Buffer Information Specification (IBIS) models are behavioral models that are used to simulate an input/output (I/O) buffer for signal integrity and/or timing. Generally speaking, IBIS models that cover typical process, voltage, and temperature conditions are pre-generated. However, as the configurability of I/Os in programmable devices continues to grow, the number of IBIS models required increases exponentially. Due to the increasingly large number of IBIS models required to cover different input and operating parameters in programmable devices, only a generic subset of IBIS models is provided. These generic models may not provide full-coverage for every possible I/O configuration.

Generally speaking, different settings and operating conditions, e.g., process, voltage and temperature (PVT) variations, need to be taken into consideration in order to generate accurate IBIS models. However, due to the almost unlimited number of possible PVT variations and other operating conditions, only a limited number of IBIS models, based on a set of predefined operating conditions, can be pre-generated. Generating IBIS models is becoming increasingly time-consuming and the coverage that these models provide is steadily diminishing.

SUMMARY

It is desirable to have design specific real-time generated IBIS models that can provide full coverage without incurring additional storage and computational costs. It is also desirable to have IBIS models that accurately reflect different environmental conditions, e.g., process, temperature and voltage settings. The following embodiments include methods for generating a simulation model for an integrated circuit (IC) design.

It should be appreciated that the present exemplary embodiments can be implemented in numerous ways, such as a process an apparatus, a system, a device or a method on a computer readable medium. Several inventive embodiments are described below.

In one embodiment, a method for generating a simulation model for a circuit design is disclosed. The method includes extracting a plurality of design properties associated with the circuit design. The design properties may include an input/output (I/O) buffer setting extracted from a first netlist of the circuit design or an environmental condition associated with the circuit design. A second netlist is generated for the circuit design based on the plurality of design properties. The second netlist is then simulated and a simulation model is generated for the circuit design based on the simulation of the second netlist.

In another embodiment, a method for generating a simulation model is provided. The method includes performing a place and route operation on a circuit design and generating a first netlist based on the place and route operation performed. A first plurality of settings is extracted from the first netlist and a second plurality of settings associated with the circuit design is determined. The first plurality of settings and the second plurality of settings are merged with a predetermined set of simulation setups to generate a second netlist. A simulation model is generated for the circuit design based on the second netlist.

In yet another embodiment, a machine-readable storage medium encoded with machine-readable instructions for generating a simulation model for a circuit design is disclosed. The machine-readable storage medium has program instructions for performing a place and route operation on the circuit design to generate a first netlist based on the circuit with a design program. A first plurality of settings is then extracted from the first netlist of the circuit design. The machine-readable storage medium also has program instructions for generating a second netlist with the first plurality of settings extracted from the first netlist and a second plurality of settings associated with the circuit design. The second netlist is simulated to generate a plurality of simulation data. The plurality of simulation data is sampled and a simulation model for the circuit design is generated based on the sampling of the plurality of simulation data.

Other aspects will become apparent from the following detailed description, taken in conjunction with the accompanying drawings, illustrating by way of example the principles of the exemplary embodiments.

BRIEF DESCRIPTION OF THE DRAWINGS

The exemplary embodiments may best be understood by reference to the following description taken in conjunction with the accompanying drawings.

DETAILED DESCRIPTION

The following embodiments describe methods for generating a simulation model for an integrated circuit (IC) design.

The present embodiments may be practiced without some or all of these specific details. In other instances, well-known operations have not been described in detail in order not to unnecessarily obscure the exemplary embodiments.

The embodiments described herein provide techniques for generating a simulation model for an IC design based on different device parameters, e.g., input/output (I/O) buffer settings, operating temperature range, etc. In one of the embodiments, an Input/output Buffer Information Specification (IBIS) model is generated based on settings of a specific circuit design. Typically a design uses multiple types of I/O buffers with various buffer settings. These settings are determined by, among other things, the type of device used, the specification of that device (the operating temperature and voltage range), and user inputs (I/O standard used and the current strength in the circuit, etc.). In an exemplary embodiment, these settings serve as inputs to an EDA tool and a design specific IBIS model is generated based on these inputs.

Figure 1:
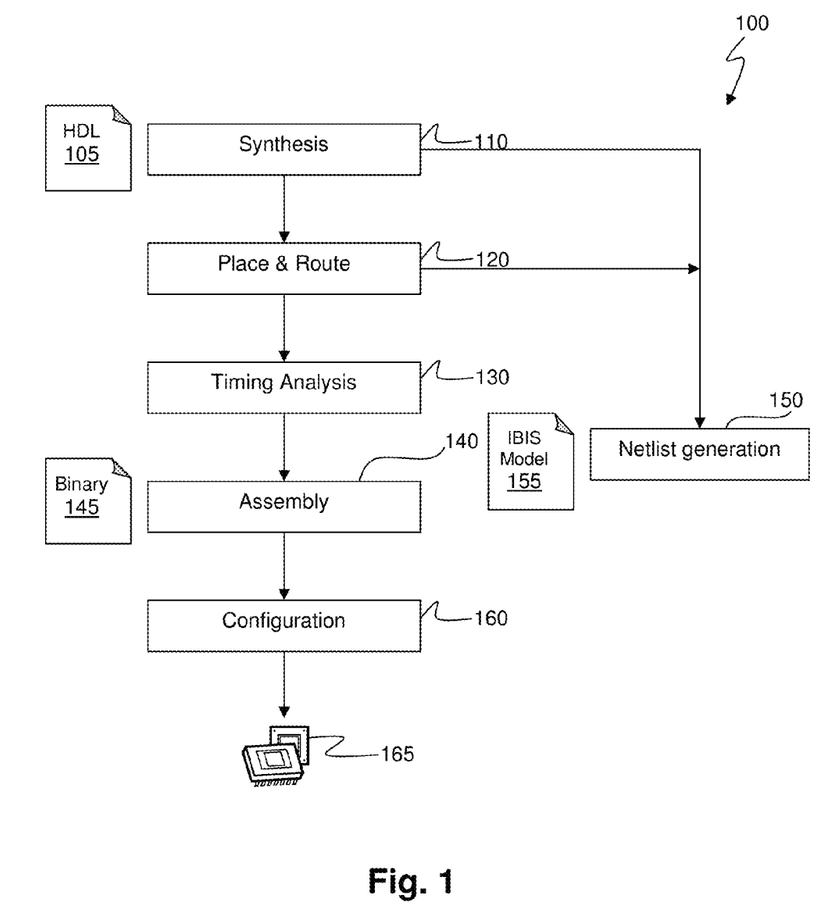
FIG. 1, meant to be illustrative and not limiting, shows a compilation flow to create a compiled design for an IC using an electronic design automation (EDA) tool, according to one embodiment.

FIG. 1, meant to be illustrative and not limiting, shows compilation flow 100 to create a compiled design for an IC using an electronic design automation (EDA) tool, according to one embodiment. The flow starts with an IC design created by a circuit developer or a hardware engineer that is embodied in a hardware description language (HDL) file 105. The IC design embodied in the HDL file is synthesized and translated into a discrete netlist of logic-gate primitives during synthesis operation 110. The synthesized logic gates and other components in the IC design are placed on the IC device during place and route operation 120. Wires are also added to connect the logic gates and all the other components in the IC to route signals in the IC design during place and route operation 120.

After place and route operation 120, timing analysis operation 130 assigns delays to the different logic gates and wires or routes in the circuit. Timing analysis operation 130 computes the lengths of different paths in the IC design and the timing constraints of the IC design, in one embodiment. Binary configuration file 145 is created during assembly operation 140. In one embodiment, binary configuration file 145 contains description of the circuit of the IC design and is used to program IC device 165 during configuration operation 160.

However, before configuring IC device 165, simulation model 155 can be generated based on the IC design. In an exemplary embodiment, simulation model 155 is an IBIS model that is generated to simulate the IC design based on different I/O buffer settings. Simulation model 155 may be generated during netlist generation operation 150 after synthesis operation 110 or place and route operation 120. However, it should be appreciated that simulation model 155 may be limited to power and ground pin information if netlist generation operation 150 is carried out after synthesis operation 110. If netlist generation operation 150 is performed after place and route operation 120, a full pin model can be generated. It should be appreciated that most operations shown in flow 100 are optional. In other words, certain operations, e.g., netlist generation 150, may be skipped if desired. However, the quality of the resulting IC design solution may be impacted by the removal of the optional operations.

Figure 2:
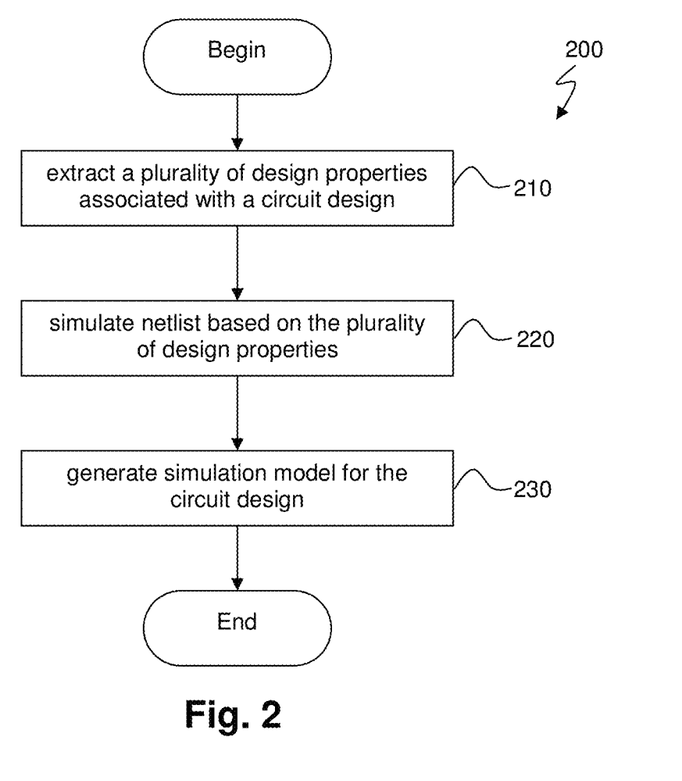
FIG. 2, meant to be illustrative and not limiting, shows a process flow to generate a simulation model for a circuit design as one embodiment.

FIG. 2, meant to be illustrative and not limiting, shows process flow 200 to generate a simulation model for a circuit design as one embodiment. In an exemplary embodiment, process flow 200 may be part of an EDA tool compilation flow, e.g., netlist generation operation 150 of flow 100 in the embodiment of FIG. 1. Flow 200 begins with extracting design properties associated with the circuit design in operation 210. The design properties may include I/O buffer settings and environmental conditions associated with the circuit design. In one embodiment, the design properties and settings may be extracted from a post place and route netlist. It is, however, appreciated that this information may be extracted after the synthesis and before the place and route operation. The environmental conditions extracted may include process-voltage-temperature (PVT) variations associated with the circuit design. The circuit design is then simulated based on the design properties in operation 220. A simulation model is generated in operation 230. In one embodiment, the simulation model is an IBIS simulation model that can be used by the circuit designer to simulate and validate the integrity of signals in the circuit design.

Figure 3:
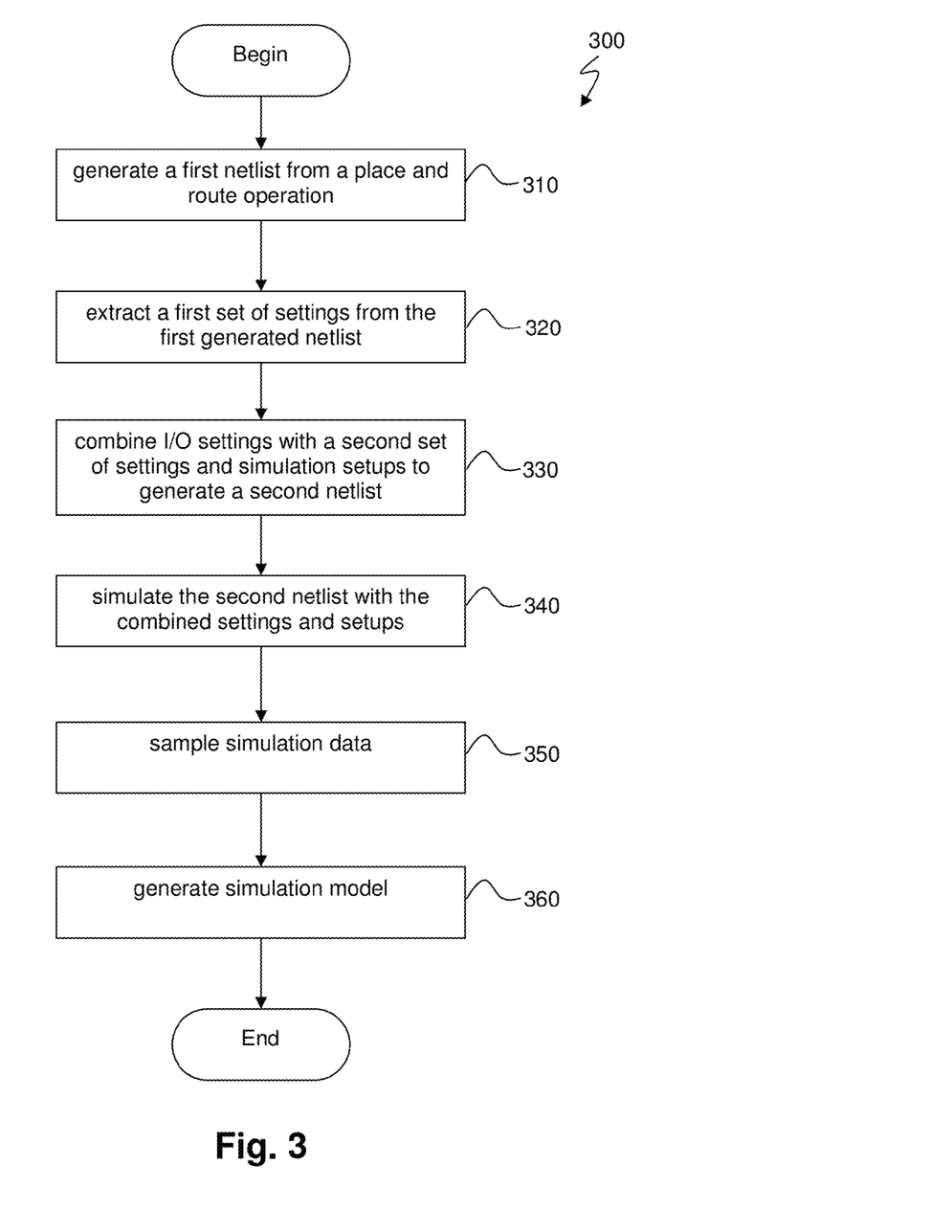
FIG. 3, meant to be illustrative and not limiting, shows another process flow for generating a simulation model as another embodiment.

FIG. 3, meant to be illustrative and not limiting, shows process flow 300 for generating a simulation model as another embodiment. Flow 300 begins with generating a first netlist based on a circuit design in operation 310. In one embodiment, the netlist may be a gate level netlist generated by performing a place and route operation on the circuit design. In another embodiment, the netlist may be a provided by a synthesis operation that is performed prior to a place and route operation. A first set of settings associated with the circuit design, e.g., I/O standards used and I/O strength of the circuit design, are extracted from the first generated netlist in operation 320.

Referring still to FIG. 3, the first set of settings is combined with a second set of settings and a number of simulation setups to generate a second netlist in operation 330. It should be appreciated that the simulation setups may include predefined of pre-generated setups to simulate different I/O buffer behaviors such as ground-clamp, power-clamp, pull-up, pull-down, and the rising and falling characteristic curves. Accordingly, specific settings extracted from the circuit design may be used to generate a simulation model based on the different simulation setups. For instance, when an input pin on the circuit design is simulated, the power-clamp and ground-clamp simulation setups are used. When a single-ended I/O pin is simulated, all six simulation setups, pull-up, pull-down, etc., are used. It should also be appreciated that a circuit design may be implemented on different IC devices and as such, may have different specifications based on the IC device used (e.g., different IC devices may have different operating temperature and voltage ranges). In an exemplary embodiment, any or all of these settings can be specified by a circuit designer through a settings page on an EDA tool. In one embodiment, all of these settings are combined with the extracted I/O settings to generate a transistor level netlist in operation 330.

Continuing from FIG. 3, the second netlist is simulated with the combined settings in operation 340. In an exemplary embodiment, the simulated netlist is a transistor level Simulation Program with Integrated Circuit Emphasis (SPICE) netlist. It should be appreciated that a SPICE netlist is a text file that contains a list of components and the connections or nets that connect all the different components together. The simulated data is sampled in operation 350. It should be appreciated that each of the I/O buffer characteristic curves, e.g., pull-up, pull-down, rising, falling, etc., has a different number of data points and the data is sampled to get a standardized number of data points. A simulation model is generated in operation 360 based on the circuit design and the associated settings.

Figure 4A:
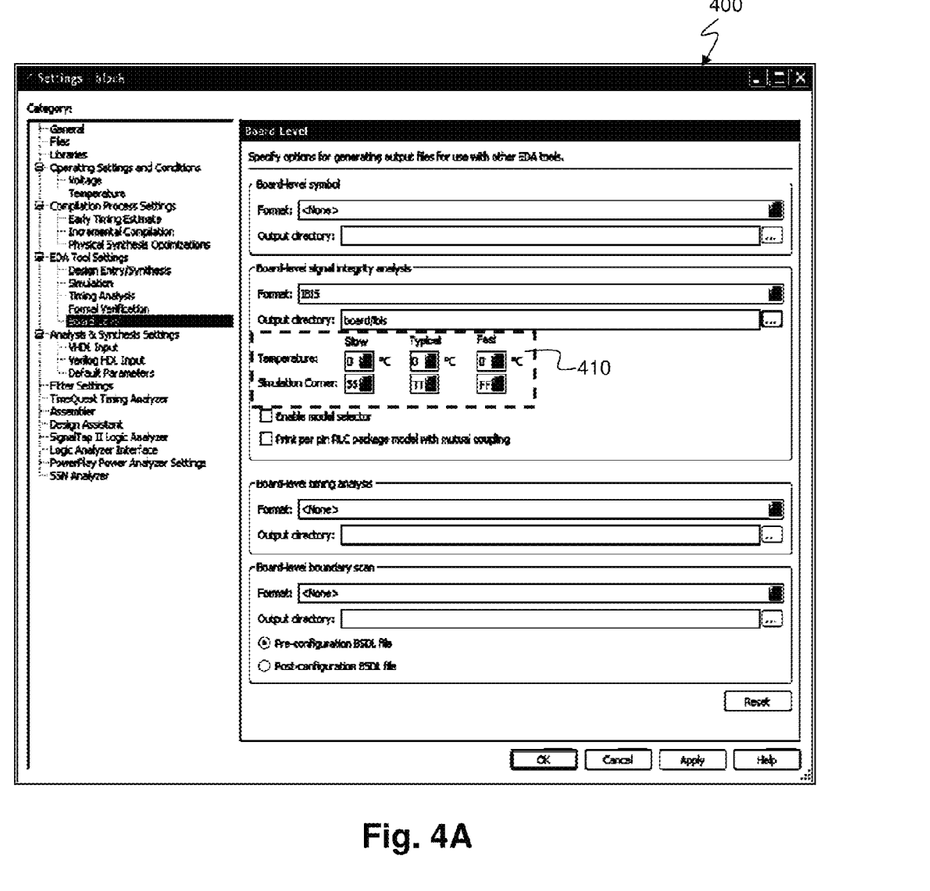
FIG. 4A, meant to be illustrative and not limiting, shows an exemplary settings page of an EDA tool as one embodiment.

FIG. 4A, meant to be illustrative and not limiting, shows an exemplary settings page 400 of an EDA tool as one embodiment. It should be appreciated that settings page 400 may be a settings page from an EDA tool that is configurable to perform any or all of the operations illustrated in flow 100 of FIG. 1. In one embodiment, a circuit designer can load a design onto an EDA tool and perform synthesis and place and route operations on the design. For example, when the design is loaded onto an EDA tool for compilation and simulation, the circuit designer can select different operating settings for the simulation models. In the embodiment of FIG. 4A, temperature and timing corner settings 410 can be set by the circuit designer and an IBIS simulation model is generated by the EDA tool based on the different temperature and timing corner settings 410 that are selected.

Figure 4B:
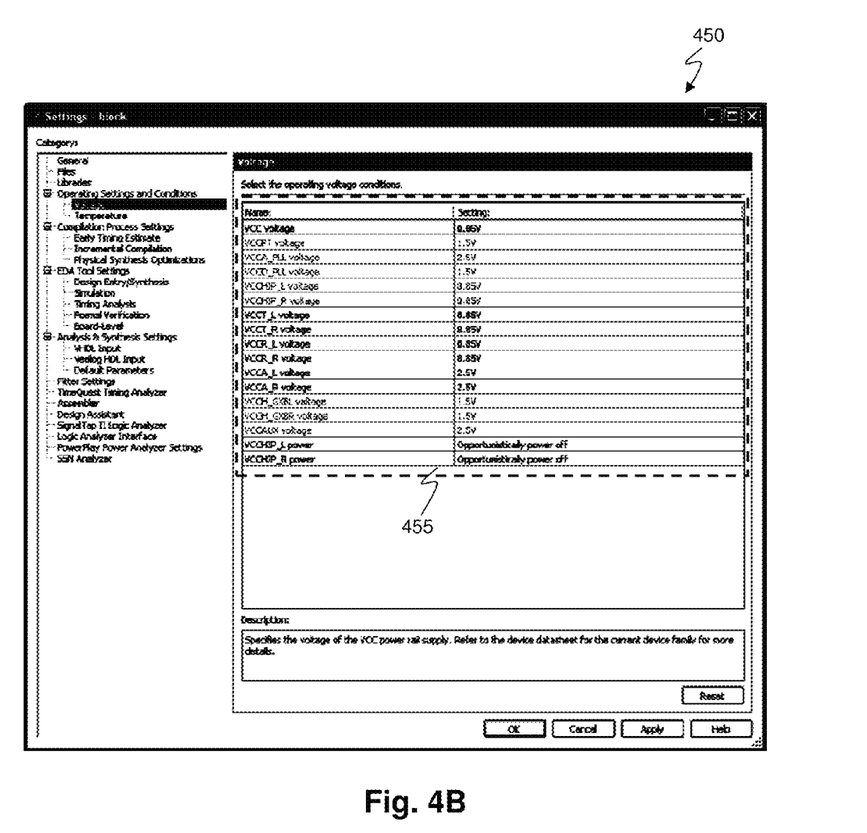
FIG. 4B, meant to be illustrative and not limiting, shows another exemplary settings page of an EDA tool as another embodiment.

FIG. 4B, meant to be illustrative and not limiting, shows another exemplary settings page 450 of an EDA tool as another embodiment. In the embodiment of FIG. 4B, settings page 450 shows the operating voltage range for a particular design that is loaded onto the EDA tool. It should be appreciated that the circuit designer may input a voltage value for any or all of the items shown in table 455. In the embodiment of FIG. 3, the first set of settings, e.g., I/O settings, extracted from the design in operation 320 is combined with a second set of settings in operation 330 that includes voltage, temperature and timing corner settings that can be modified through different settings pages as illustrated in the embodiments of FIGS. 4A and 4B. An appropriate simulation model is generated based on the values that are provided by the circuit designer. In the embodiment of FIG. 1, after performing synthesis operation 110 and place and route operation 120, different simulation models can be generated through simulation generation operation 150 based on different settings that are provided by the circuit designer through settings pages 400 and 450 of FIGS. 4A and 4B, respectively. Even though only a few exemplary choices or settings are shown in the embodiments of FIGS. 4A and 4B, it should be appreciated that additional relevant options and settings may be provided in this context.

Figure 5:
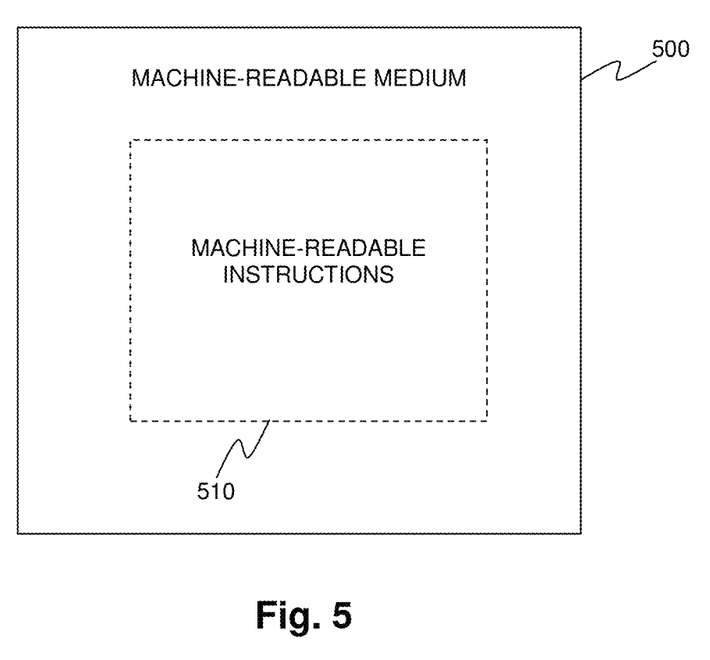
FIG. 5 is a simplified block diagram showing a machine-readable medium encoded with machine-readable instructions as an embodiment.

The method operations can also be embodied as machine-readable instructions 510 on machine-readable storage medium 500 as shown in FIG. 5. Machine-readable storage medium 500 is any data storage device that can store data, which can thereafter be read by a machine or a computer system. Illustrative examples of machine-readable storage medium 500 include hard drives, network attached storage (NAS), read-only memory, random-access memory, CDs, DVDs, USB drives, volatile and non-volatile memory, and other optical and non-optical data storage devices. Machine-readable storage medium 500 can also be distributed over a network-coupled computer system so that machine-readable instructions 510 are stored and executed in a distributed fashion. Machine-readable instructions 510 can perform any or all of the operations illustrated in FIGS. 1, 2 and 3.

Figure 6:
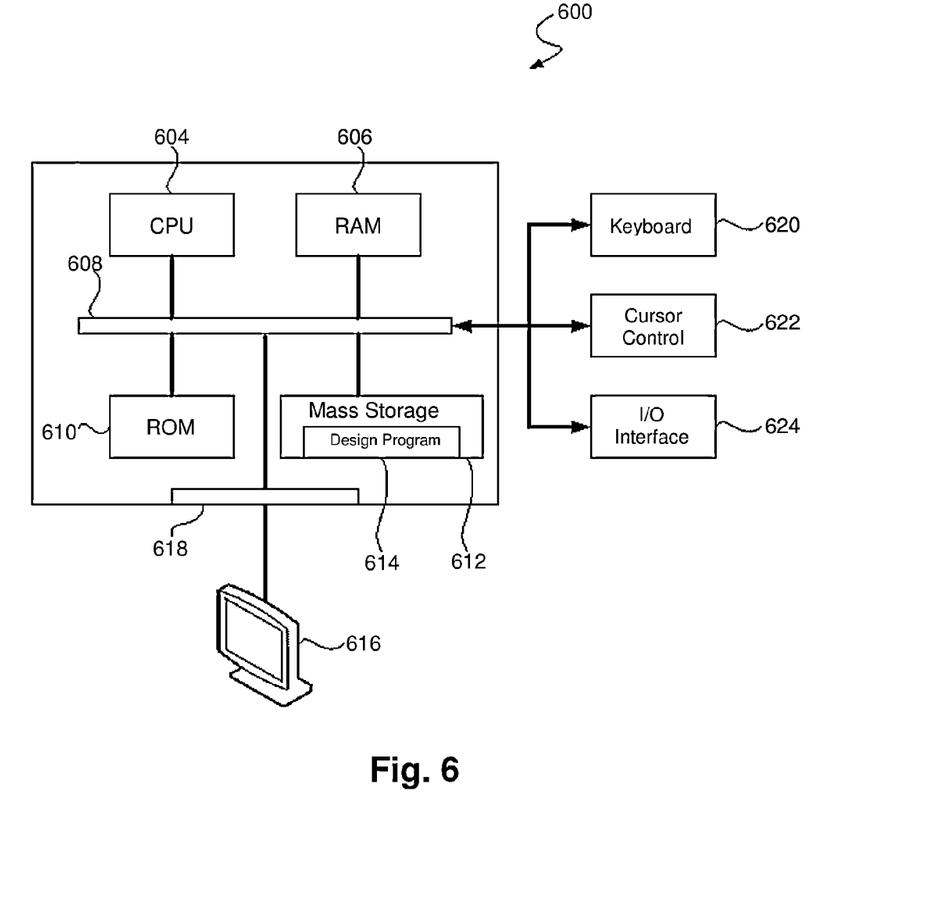
FIG. 6 is a simplified schematic diagram of a computer system for implementing the exemplary embodiments.

FIG. 6 is a simplified schematic diagram of a computer system 600 for implementing embodiments described herein. It should be appreciated that the methods described herein may be performed with a digital processing system, such as a conventional, general-purpose computer system. Special-purpose computers, which are designed or programmed to perform one function may be used in the alternative. In addition, the computer system of FIG. 6 may be used for the purpose of power analysis and optimization. The computer system includes a central processing unit (CPU) 604, which is coupled through bus 608 to random access memory (RAM) 606, read-only memory (ROM) 610, and mass storage 612. Mass storage device 612 represents a persistent data storage device such as a floppy disc drive or a fixed disc drive, which may be local or remote. Design program 614, e.g., an EDA tool that can perform any or all of the operations illustrated in FIG. 1, resides in mass storage 612, but can also reside in RAM 606 during processing. It should be appreciated that CPU 604 may be embodied in a general-purpose processor, a special-purpose processor, or a specially programmed logic device.

Referring still to FIG. 6, display 616 is in communication with CPU 604, RAM 606, ROM 610, and mass storage device 612, through bus 608 and display interface 618. Display 616 is configured to display the user interface and visual indicators or graphical representations described herein. Keyboard 620, cursor control 622, and interface 624 are coupled to bus 608 to communicate information in command selections to CPU 604. This user input is then communicated to CPU 604. It should be appreciated that data to and from external devices may be communicated through interface 624.

The embodiments, thus far, were described with respect to integrated circuits. The method and apparatus described herein may be incorporated into any suitable circuit. For example, the method and apparatus may be incorporated into numerous types of devices such as microprocessors or programmable logic devices. Exemplary programmable logic devices include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing exemplary embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for generating a simulation model for a circuit design, said method comprising:
   extracting a plurality of design properties associated with the circuit design, wherein the plurality of design properties includes an input/output (I/O) buffer setting extracted from a first netlist of the circuit design;
   generating a second netlist for the circuit design based on the plurality of design properties, with a second plurality of settings, wherein the second plurality of settings includes an operating temperature and a voltage range;
   simulating the second netlist through a processor to generate a plurality of simulation data;
   sampling the plurality of simulation data; and
   generating a simulation model for the circuit design based on the simulating of the second netlist and based on the sampling the plurality of simulation data, wherein the simulation model is a model simulating a plurality of I/O buffer behaviors of the circuit design.

2. The method of claim 1, wherein the circuit design is for a programmable logic device (PLD), and wherein the first netlist is a gate level netlist and the second netlist is a transistor level netlist.

3. The method of claim 1, wherein the I/O buffer setting is extracted from an environmental condition included in the plurality of design properties includes a process-voltage-temperature (PVT) variation associated with the circuit design.

4. The method of claim 3, wherein the I/O buffer setting is based on the PVT variation of an IC device.

5. The method of claim 1, further comprising:
   performing a place and route operation on the circuit design to generate the first netlist.

6. The method of claim 1, further comprising:
   combining the plurality of design properties with a plurality of predefined simulation setups prior to the generating of the second netlist, and wherein the second netlist is simulated based on the combined plurality of design properties and the plurality of predefined simulation setups.

7. A method of generating a simulation model, said method comprising:
   performing a place and route operation on a circuit design;
   generating a first netlist based on the place and route operation performed;
   extracting a first plurality of settings from the first netlist;
   determining a second plurality of settings associated with the circuit design, wherein the second plurality of settings includes an operating temperature and a voltage range;
   merging a predetermined set of simulation setups with the first plurality of settings and the second plurality of settings to generate a second netlist through a processor; and
   generating the simulation model for the circuit design based on the second netlist, wherein the simulation model is a model simulating a plurality of I/O buffer behaviors of the circuit design.

8. The method of claim 7, wherein the first netlist is a gate level netlist and the second netlist is a transistor level netlist.

9. The method of claim 7, wherein the first plurality of settings include a plurality of I/O buffer settings and wherein the second plurality of settings includes a plurality of operating conditions.

10. The method of claim 9, wherein the simulation model is generated based on the plurality of input/output (I/O) buffer settings, and wherein the simulation model simulates the plurality of I/O buffer behaviors based on the plurality of I/O buffer settings.

11. The method of claim 9, wherein the plurality of operating conditions includes at least one of a process setting, a voltage setting or a temperature setting.

12. The method of claim 7, further comprising:
   receiving a user input; and
   updating the circuit design based on the user input, wherein the plurality of second plurality of settings with the circuit design is determined based on the user input.

13. The method of claim 7, wherein the simulation model is an input/output buffer information specification (IBIS) model.

14. A non-transitory machine-readable storage medium encoded with sequences of instructions for generating a simulation model for a circuit design, the sequences of instructions which when executed, cause a machine to perform a method comprising:
   performing a place and route operation on the circuit design to generate a first netlist based on the circuit design;
   extracting a first plurality of settings from the first netlist of the circuit design;
   generating a second netlist with the first plurality of settings extracted from the first netlist and a second plurality of settings associated with the circuit design, wherein the second plurality of settings includes an operating temperature and a voltage range of the PLD;
   simulating the second netlist to generate a plurality of simulation data;
   sampling the plurality of simulation data; and
   generating a simulation model for the circuit design based on the sampling of the plurality of simulation data, wherein the simulation model is a model simulating a plurality of input/output (I/O) buffer behaviors of the circuit design.

15. The machine-readable medium of claim 14, wherein the first plurality of settings includes a plurality of input/output (I/O) buffer settings, and wherein the simulation model is an Input Output Buffer Information Specification (IBIS) model.

16. The machine-readable medium of claim 14, wherein the circuit design is for a programmable logic device (PLD).

17. The machine-readable medium of claim 14, wherein said method further comprises:
   merging the first and second pluralities of settings with a plurality of predetermined simulation setups prior to the generating the second netlist, wherein the second netlist is generated based on the merged settings and the plurality of predetermined simulation setups.

18. The machine-readable medium of claim 14, wherein said method further comprises:
   receiving a plurality of user inputs associated with the circuit design, wherein at least a portion of the second plurality of settings is extracted from the plurality of user inputs.

19. The machine-readable medium of claim 18, wherein the plurality of user inputs comprises one of a timing corner or an operating temperature value.

20. The machine-readable medium of claim 19, wherein the generated simulation model is capable of simulating the circuit design based on at least one of the timing corner or the operating temperature value.

* * * * *